(12) United States Patent
Nuss

(10) Patent No.: US 11,427,131 B2
(45) Date of Patent: Aug. 30, 2022

(54) MOTOR-VEHICLE ACCESSORY

(71) Applicant: Ralph Nuss, Poppenricht (DE)

(72) Inventor: Ralph Nuss, Poppenricht (DE)

(73) Assignee: GRAMMER AG, Ursensollen (DE)

( * ) Notice: Subject to any disclaimer, the term of this patent is extended or adjusted under 35 U.S.C. 154(b) by 129 days.

(21) Appl. No.: 17/092,249

(22) Filed: Nov. 7, 2020

(65) Prior Publication Data

US 2021/0170952 A1 Jun. 10, 2021

(30) Foreign Application Priority Data

Dec. 5, 2019 (DE) .......................... 102019133258.3

(51) Int. Cl.
*B60R 7/04* (2006.01)
(52) U.S. Cl.
CPC ...................................... *B60R 7/04* (2013.01)
(58) Field of Classification Search
CPC .......... B60R 7/04; B60N 2/773; B60N 2/767; B60N 3/00; B60N 2/763
USPC ................. 296/24.34, 37.8, 1.09, 153, 24.46
See application file for complete search history.

(56) References Cited

U.S. PATENT DOCUMENTS

| | | | | |
|---|---|---|---|---|
| 5,816,645 A * | 10/1998 | Grimes | .................. | B60N 2/914 |
| | | | | 296/153 |
| 6,145,919 A * | 11/2000 | Mysliwiec | ............... | B60N 2/78 |
| | | | | 296/153 |
| 9,156,385 B1 | 10/2015 | Lewis | | |
| 2008/0164718 A1 * | 7/2008 | Quigley | .................. | B60N 2/753 |
| | | | | 296/153 |
| 2019/0389352 A1 * | 12/2019 | Koller | ...................... | B60N 2/77 |

FOREIGN PATENT DOCUMENTS

KR 101024096 B1 3/2011

\* cited by examiner

*Primary Examiner* — D Glenn Dayoan
*Assistant Examiner* — E Turner Hicks
(74) *Attorney, Agent, or Firm* — Andrew Wilford

(57) ABSTRACT

The invention relates to an accessory, with a base (11) and an adjustment part (12), movable in translation and/or in rotation relative to the base, that is movable along a path between a first end position and a second end position and can be locked in at least one position with a locking device (13) with first locking formations that are associated with the adjustment part (12) and second locking formations that are associated with the base (11), with a control system with a first controller associated with the adjustment part (12) and a second controller associated with the base (11), with which controller the locking device (13) is adjustable between a catch position and a release position depending on the position of the adjustment part (12).

Figure 1A:
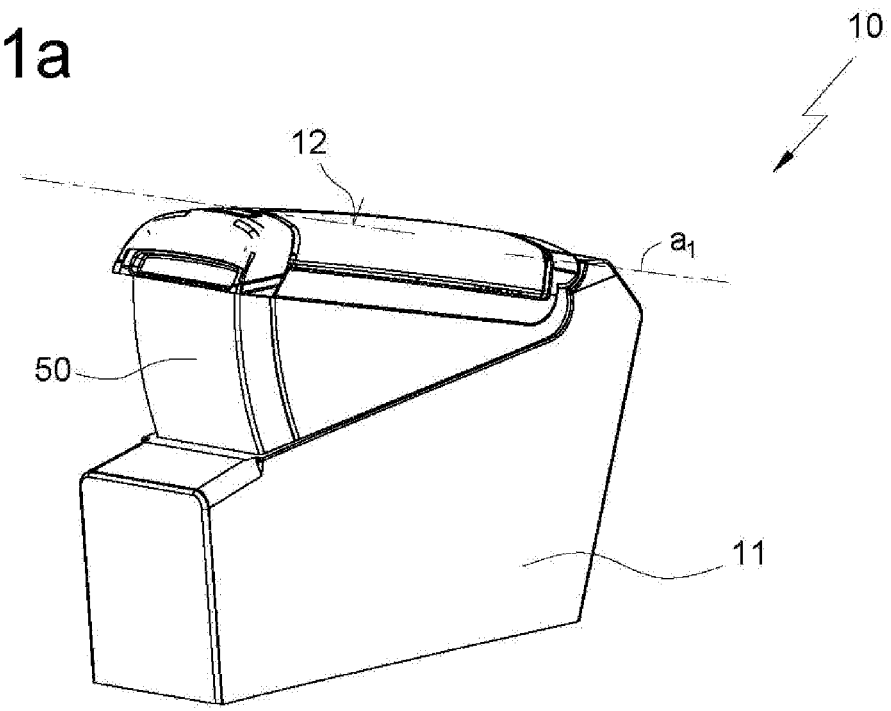

The special feature consists in that the one set of controller comprises a first switching element (21) on a first end region of the path and a second switching element (22) on a second end region, wherein a movable setting device (37) of the other set of controller can be actuated by of the switching element (21, 22) in such a way that locking formations that are in an operative connection with the setting device (37) are movable between a catch position and a release position.

11 Claims, 11 Drawing Sheets

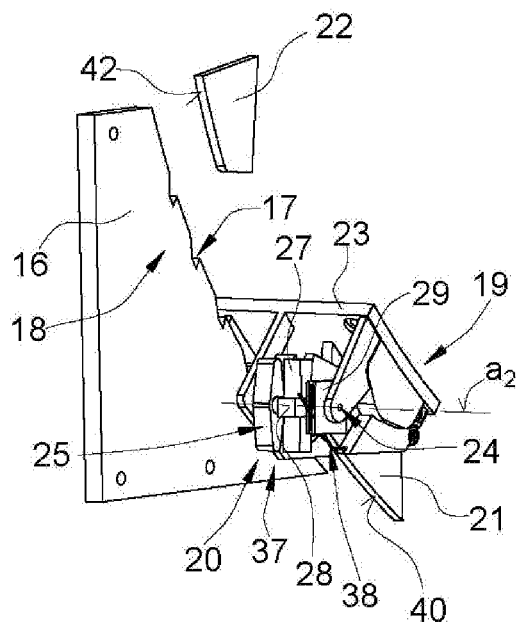
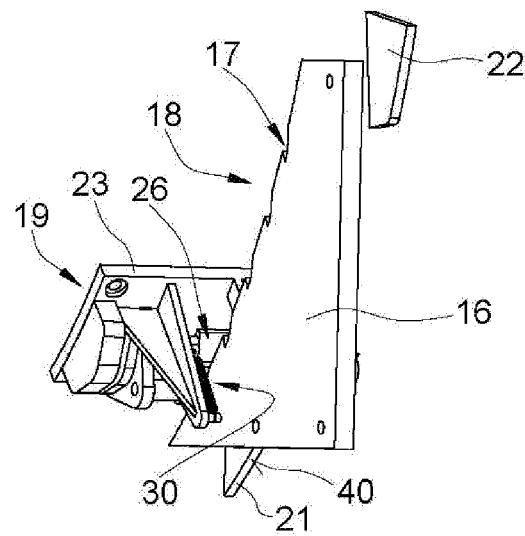
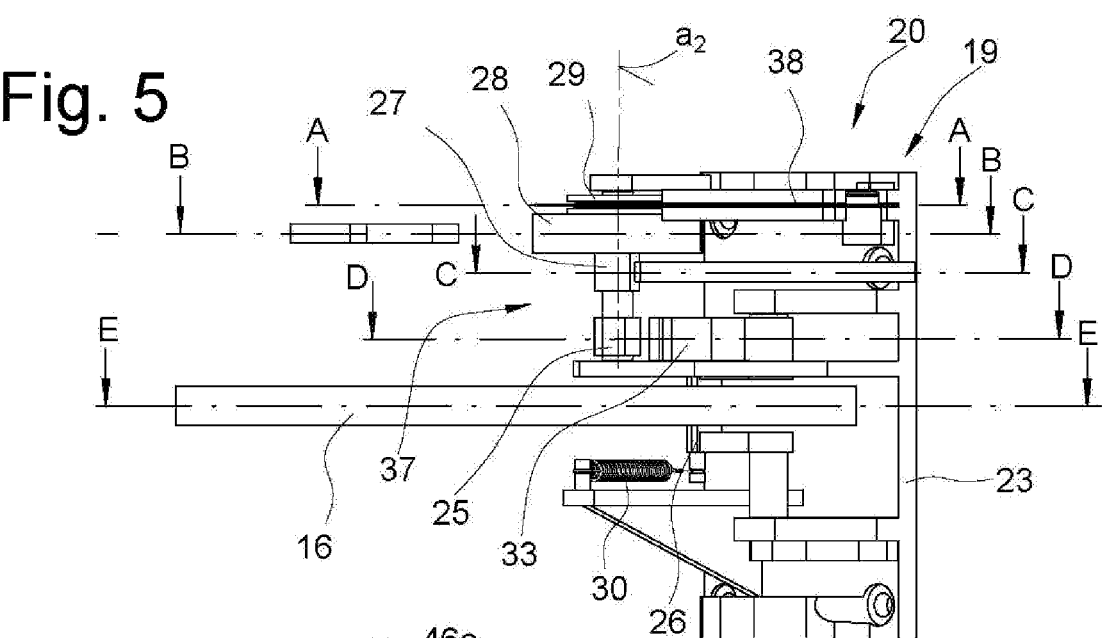
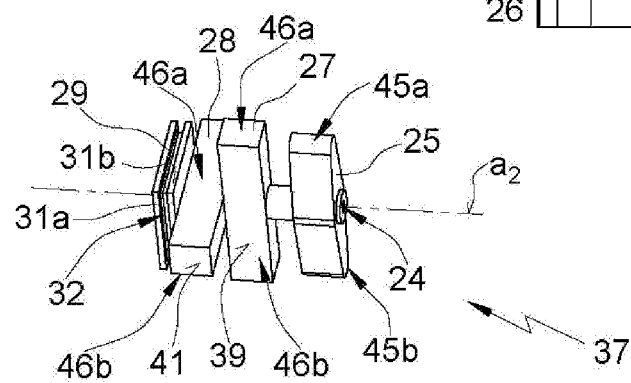

MOTOR-VEHICLE ACCESSORY

The invention relates to an accessory of a vehicle. "Vehicle" in the context of the invention is a land vehicle, aircraft or water craft. The accessory comprises a base and an adjustment part movable relative to the base. A locking device can lock the adjustment part in different positions with respect to at least one direction of movement.

A vehicle accessory of this type is e.g. a vehicle console with a body-mounted or seat-mounted base and an arm support pivotably mounted on the base, wherein the arm support is adjustable between different inclined positions and lockable in the set positions in steps. The arm support has a catch that cooperates with toothing in such a way that the arm support can be moved upwards out of a lower end position in the direction of an upper end position, wherein a downward movement of the arm support however is not possible. A control of the armrest, in the upper end position, disengages the catch from the toothing, so that a downward movement into the lower end position is possible.

The object of the invention was to provide an accessory that comprises a control for the locking device, wherein the control is to be of simple construction.

This object has been achieved by an accessory having the features of claim 1.

The accessory comprises a base and an adjustment part that is movable relative to the base. The adjustment part is movable e.g. in rotation or in translation or performs a mixed movement with translatory and rotatory components. The adjustment part is movable along a path between a first end position and a second end position. For example, the adjustment part is movably mounted pivotably between the first end position and the second end position. Alternatively, the adjustment part is e.g. mounted displaceably.

The adjustment part can be locked in at least one position by a locking device with a first locking formation on the adjustment part and a second locking formation on the base. The locking device is movable between a catch position and a release position. In the catch position, the adjustment part is locked immovably in at least one direction. That is to say, it is locked immovably e.g. with respect to both directions of movement, or alternatively it is locked immovably e.g. with respect to one direction of movement and is movable in an opposite direction of movement. In the release position, the adjustment part is movable in both directions of movement.

Since the catch position and the release position of the locking device depend on the position of the locking formations relative to each other, the terms "catch position" and "release position" are also used for the relative position of the locking formations. The locking formations in the catch position are engaged in such a way that movement of the adjustment part is prevented as explained above. In the case of step-wise locking, e.g. by a pawl being able to engage in cutouts in the counter-structure that are arranged at intervals on a path, the locking formations are e.g. also in the catch position when there is the possibility of moving into a cutout, e.g. the pawl is however still in contact with a face between the cutouts.

The locking device cooperates with a control system with a first controller that are associated with the adjustment part and second controller that are associated with the base, with which controller the locking device is adjustable between a catch position and a release position depending on the position of the adjustment part.

One of controller comprises at least a first switching element on a first end region of the path, and the other set of controller comprises at least a second switching element on a second end region of the path. The switching elements form at least a part of the one set of controller, i.e. of the first controller or the second controller. Each switching element can actuate a setting device that is movable relative to the switching element in such a way that the locking formations that are in an operative connection with the setting device are movable between a catch position and a release position. The setting device forms at least part of the other set of controller, i.e. of the second controller or the first controller.

The locking formations may comprise e.g. both a catch that engages in a form-fit in a counter-structure and also alternatively a brake that cooperates in a force-fit with a counter-structure, which brake is based on a clamping or friction principle. The locking formations could be formed e.g. of at least one clamping jaw that cooperates with a clamping face. In other words, the term "locking formations" is intended not to restrict the cooperating locking structures between the base and adjustment part to structures that cooperate in a form-fit.

The setting device is movable e.g. between an actuation position and an enabling position, wherein the locking formations in the actuation position are in the release position, and in the enabling position are in the catch position. In the enabling position, the locking formations are e.g. unactuated, and are loaded in engagement with the other locking formations by a restoring device.

The setting device comprises e.g. at least one setting structure, that cooperates with the catch, and at least one switching structure, that cooperates with at least one switching element. The setting structure and the switching structure are motionally connected together. In this way, movement of the setting device resulting from the cooperation of the switching structure with the switching element is transmitted to the setting structure, that moves the locking formations between the catch position and the release position.

At least two setting structures and/or at least two switching structures may for example be provided. In this case, it is possible for each switching element to provide a separate switching structure on the setting device.

For example, at least a first switching structure cooperates with a first switching element and at least a second switching structure cooperates with a second switching element of the setting device. Movements of the setting device into the actuation position and into the enabling position can then be controlled separately from each other.

For example, the setting device is designed to be rotatable about an axis of rotation. The setting device can then be designed with low installation space. Furthermore, it is possible, by of slight rotation, to move the setting device between the actuation position and the enabling position.

In the event that the setting device is designed to be rotatable, for example at least two setting structures and/or at least two switching structures are offset to each other angularly or axially with respect to the axis of rotation. The setting structures and/or the switching structures are e.g. connected fixedly to the rotation spindle. Switching structures that are offset angularly and/or switching structures that are axially offset are associated with e.g. an element.

In the case of an offset angularly, redundant means are present that ensure the functions of the control system upon unintentional turning of the setting device.

For example, at least one setting structure and at least one switching structure are on the rotation spindle axially offset, i.e. offset in the direction parallel to the axis of rotation of the setting device. This may for example be the case if a first switching element cooperates with at least a first switching structure in a first spatial plane and a second switching element cooperates with at least a second switching structure in a second spatial plane. The first spatial plane and the second spatial plane are e.g. parallel.

The setting device comprises e.g. a positioning device that holds the setting device in the position set in each case. The positioning device prevents the setting device from unintentionally moving out of the set actuation position or enabling position.

The positioning device is formed e.g. by a latch that comprises a first latch formation in the form of a spring and second latch formation in the form of a latching seat for the spring, wherein the one set of latch formation are motionally connected to the setting device and the other set of latch formation are fixedly connected to the adjustment part or to the base. For example, at least two latching seats are motionally connected to the setting device, with a first latching seat cooperating with the spring in order to hold the setting device in the actuation position and a second latching seat cooperating with the spring in order to hold the setting device in the enabling position. If the setting device comprises a plurality of setting structures, e.g. two setting structures, likewise a plurality of first latching seats, e.g. two first latching seats, and a plurality of second latching seats, e.g. two second latching seats, may be present.

The accessory comprises e.g. a brake that brakes movement of the adjustment part in at least one direction. The brake comprises a first brake that are associated with the adjustment part and second brake that are associated with the base. If the locking device is in the release position, in this way it is guaranteed that a controlled movement of the adjustment part that is loaded e.g. by a spring or by weight takes place.

If the adjustment part is e.g. an arm support of an armrest, the brake prevents the arm support from suddenly moving out of the upper position into the lower position after the adjustment of the locking device into the release position. The brake guarantees slow, controlled lowering. The brake may be e.g. a grease brake with a high-viscosity medium. The one set of brake of the brake comprises e.g. a toothed rail that extends along the path, and the other set of brake comprises e.g. a toothed wheel that rolls on the toothed rail and is braked by the grease brake.

The accessory is e.g. a vehicle armrest and the adjustment part is an arm support that is movable, e.g. pivotable, relative to a body-mounted base. The arm support is movable between a lower first end position and an upper second end position. If the arm support is moved upwards out of the lower end position, the locking device is e.g. in the catch position, in which a movement in the direction of the second end position (upwards) is possible, but a movement in the direction of the first end position (downwards) is prevented. In the region of the upper end position, the locking device is adjusted e.g. by the control system into the release position, in which a movement in the direction of the first end position is possible. In the region of the lower end position, the locking device is adjusted e.g. by the control system into the catch position, in which a movement of the arm support in the direction of the second end position is possible, but is prevented in the direction of the first end position.

An example of embodiment of the invention is described by way of example in the following description of the figures, also with reference to the schematic drawings. In this case, for clarity—also insofar as different examples of embodiment are concerned—identical or comparable parts or elements or regions are designated with identical reference signs, sometimes with the addition of lowercase letters.

Features that are described, illustrated or disclosed only in relation to one example of embodiment may in the context of the invention also be provided in any other example of embodiment of the invention. Examples of embodiment that are thus altered—even if not shown in the drawings—are also covered by the invention.

All the disclosed features are per se essential to the invention. The disclosure content of the cited publications and of the described devices of the prior art is also hereby incorporated in full in the disclosure of the application, also for the purpose of jointly including individual or several features of the subject-matter disclosed therein in one or in several claims of the present application. Such altered examples of embodiment—even if not shown in the drawings—are also covered by the invention.

Figure 1B:
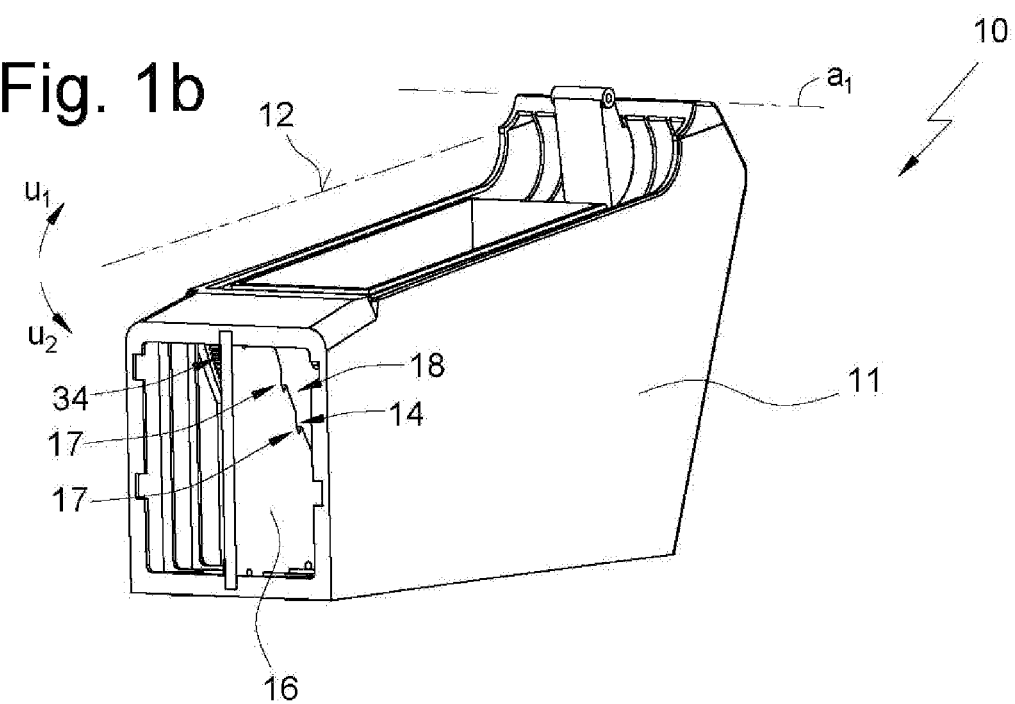
Figure 2A:
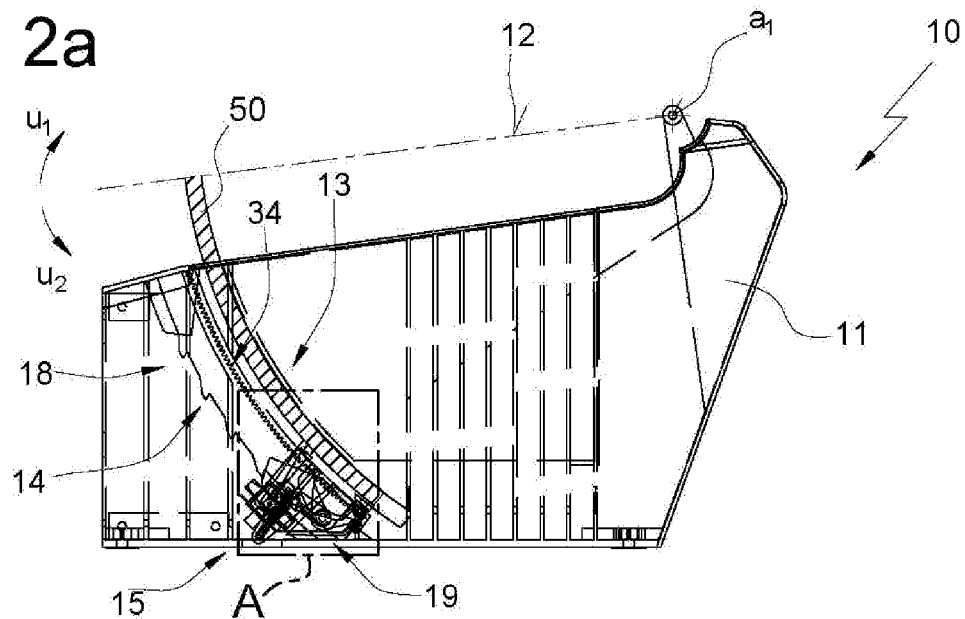
Figure 2B:
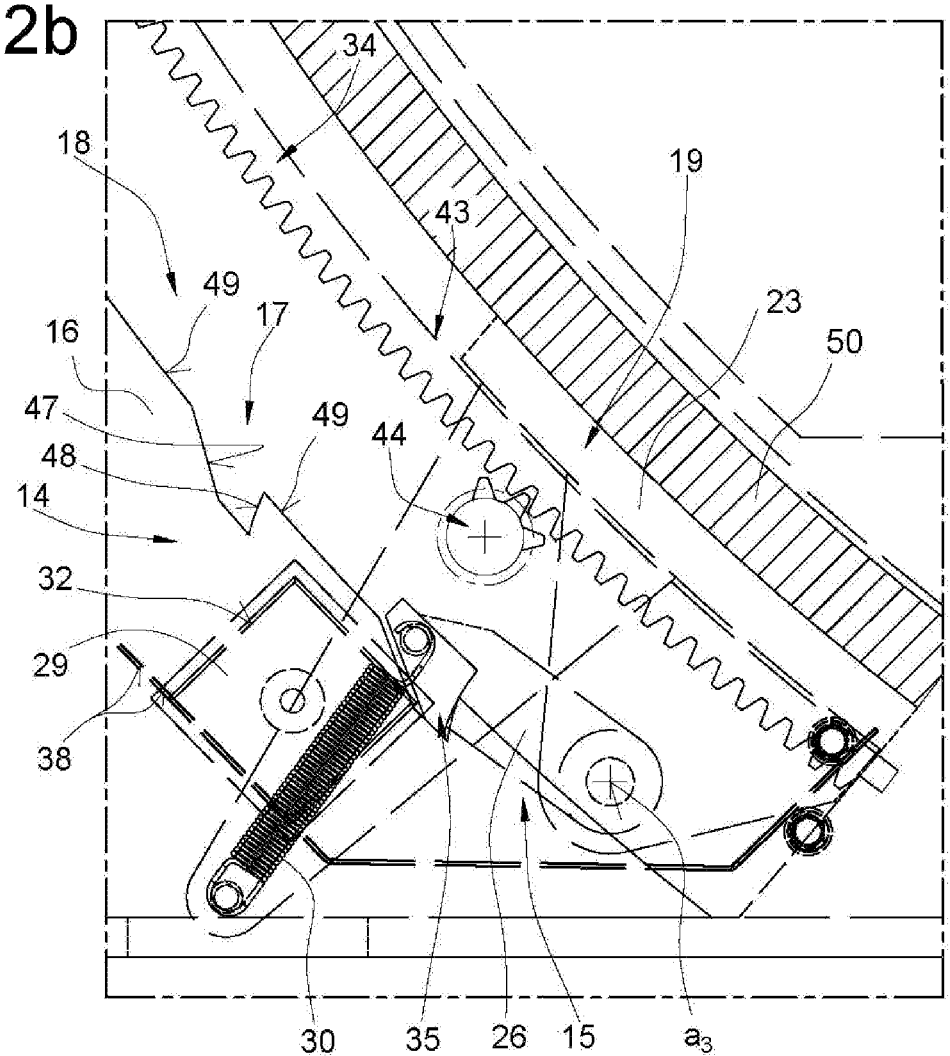
Figure 7:
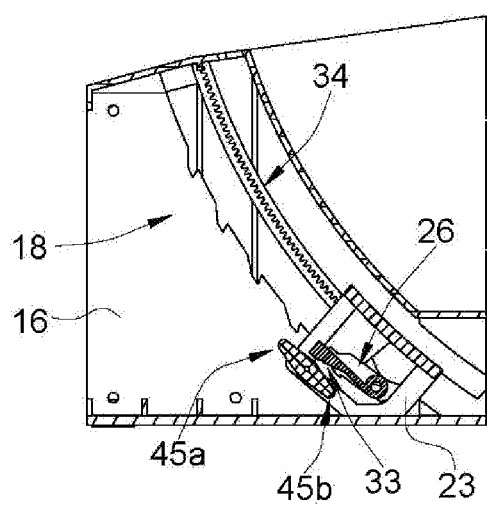
Figure 8:
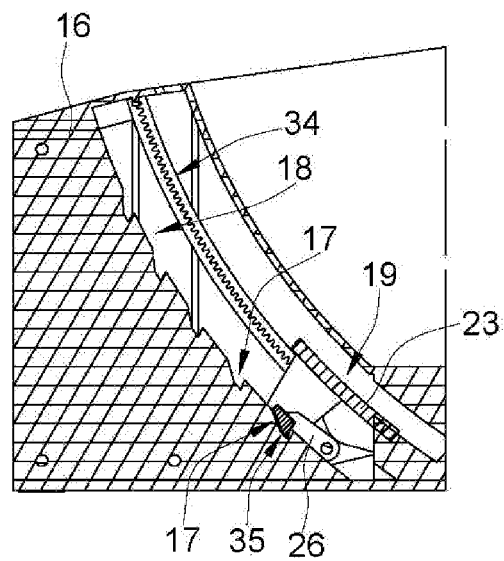
Figure 9:
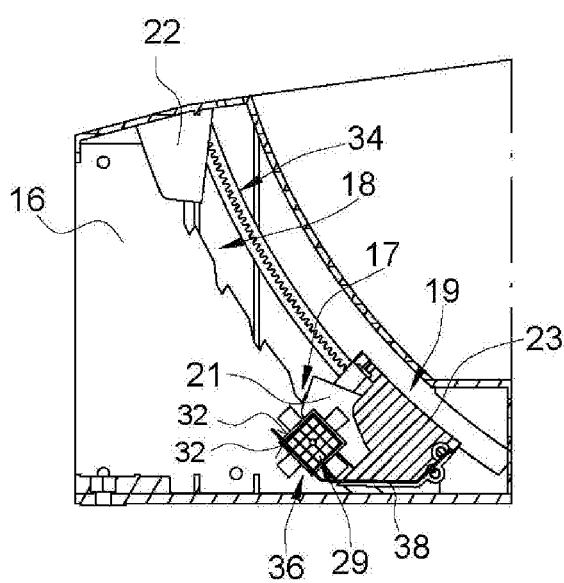
Figure 10:
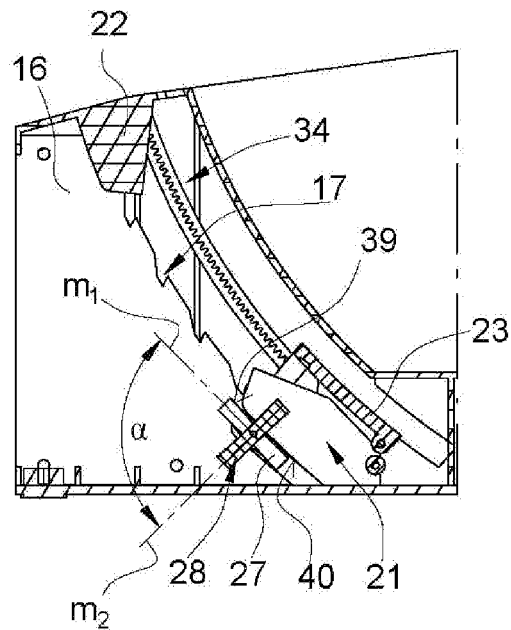
Figure 11:
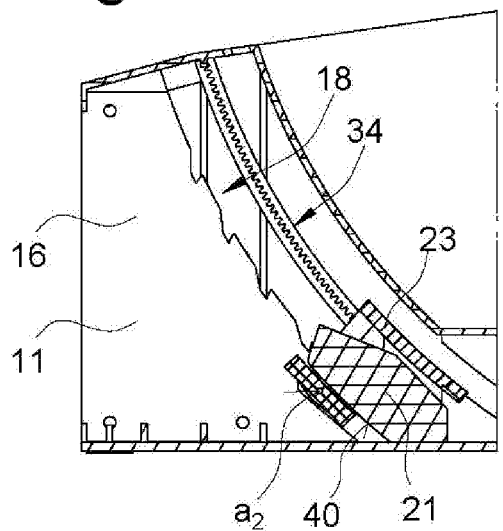
Figure 12:
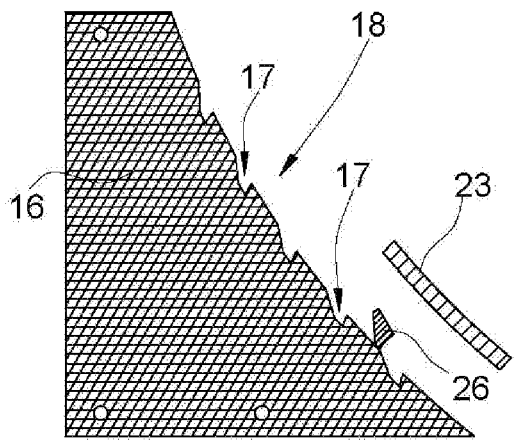
Figure 13:
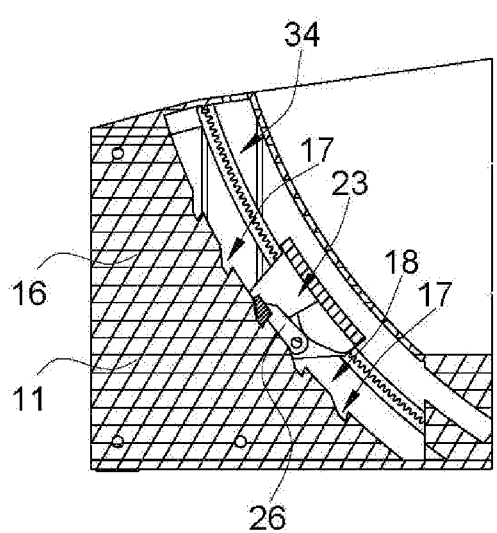
Figure 14:
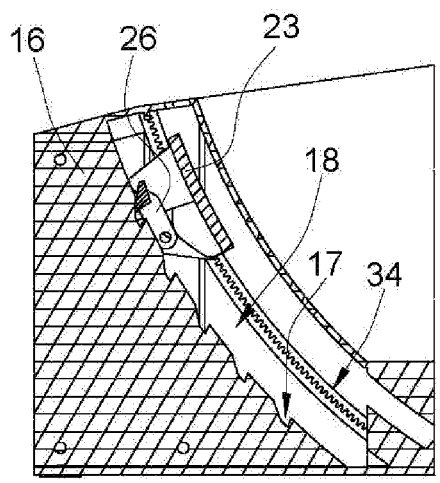
Figure 15:
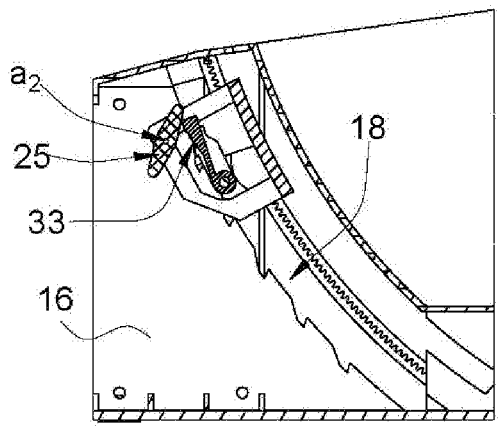
Figure 16:
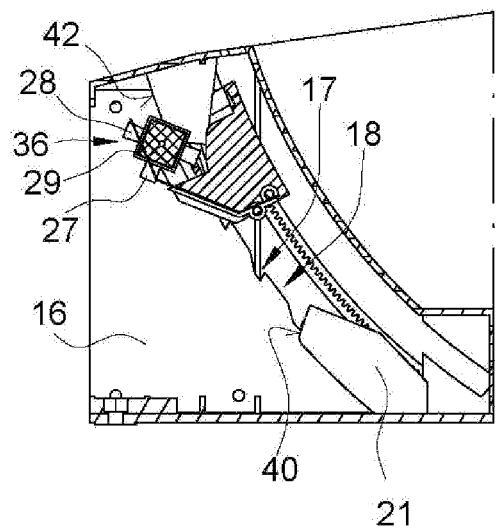
Figure 17:
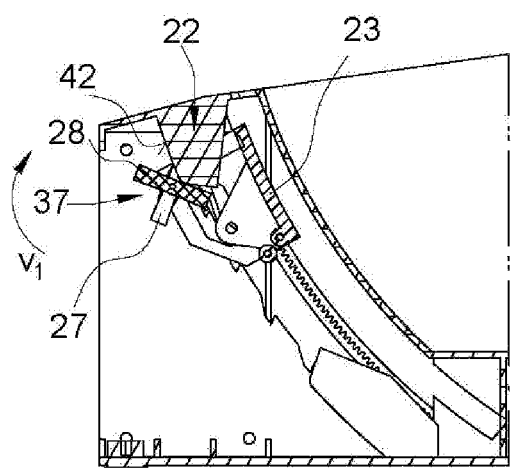
Figure 18:
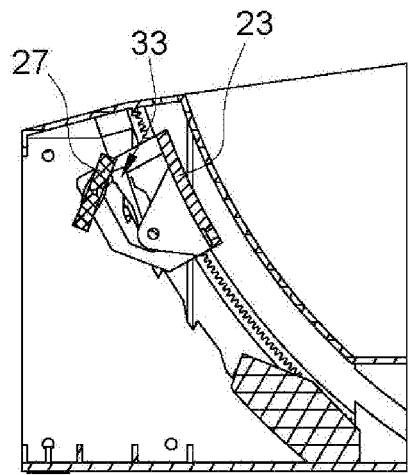
Figure 19:
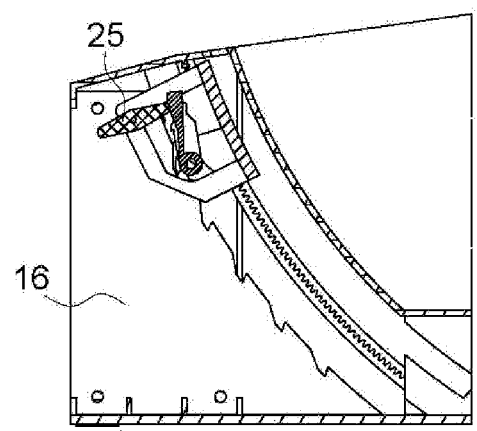
Figure 20:
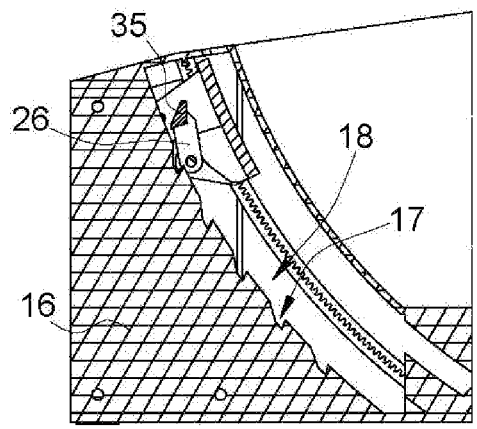
Figure 21:
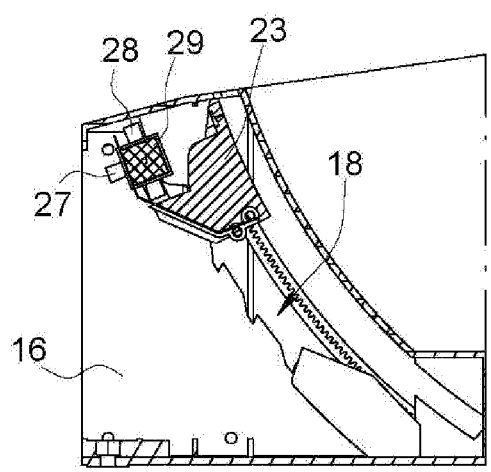
Figure 22:
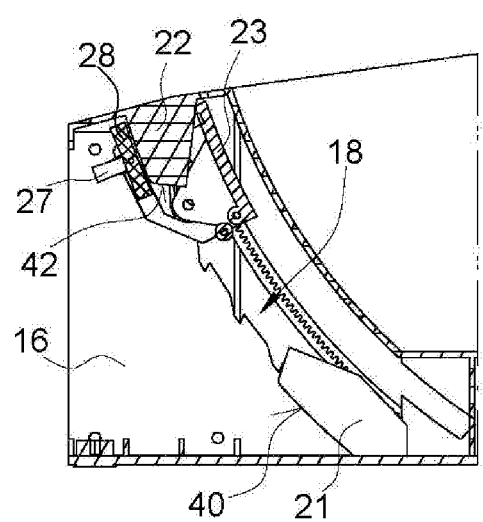
Figure 23:
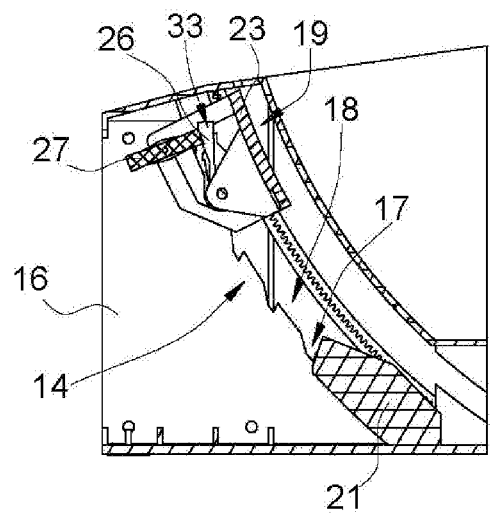
Figure 24:
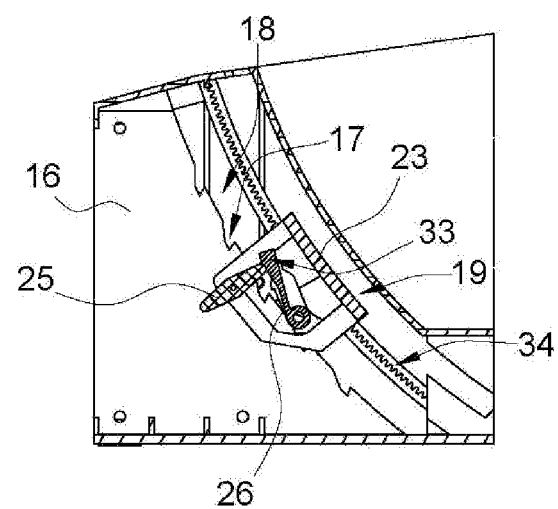
Figure 25:
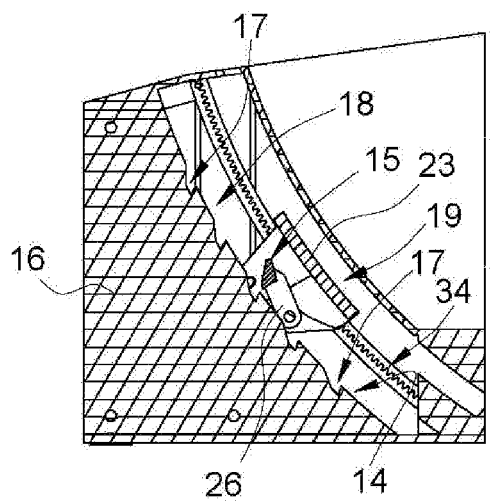
Figure 26:
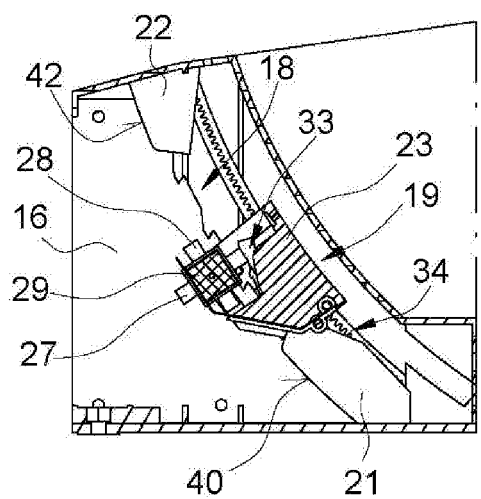
Figure 27:
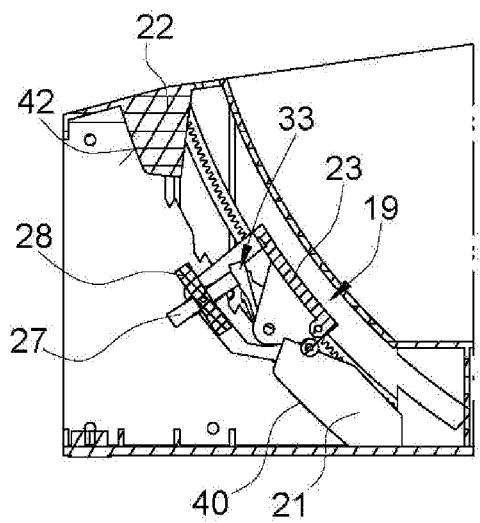
Figure 28:
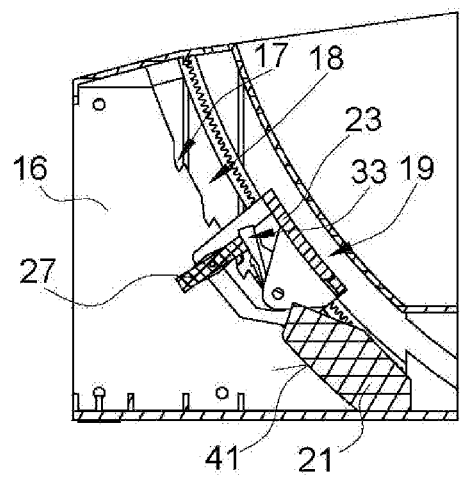
Figure 29:
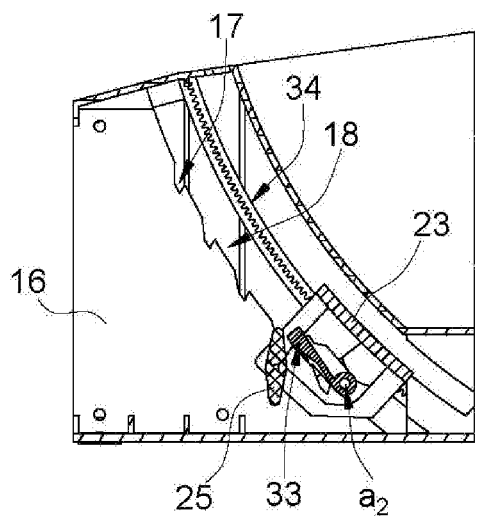
Figure 30:
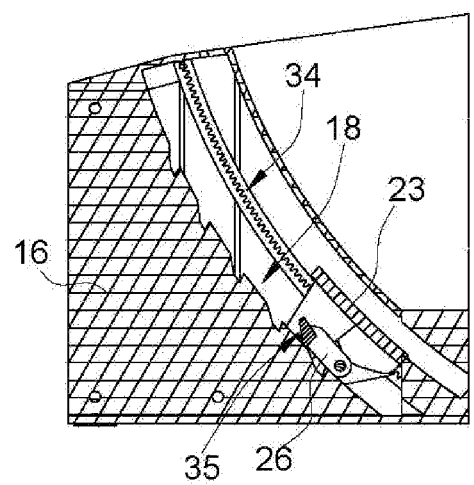
Figure 31:
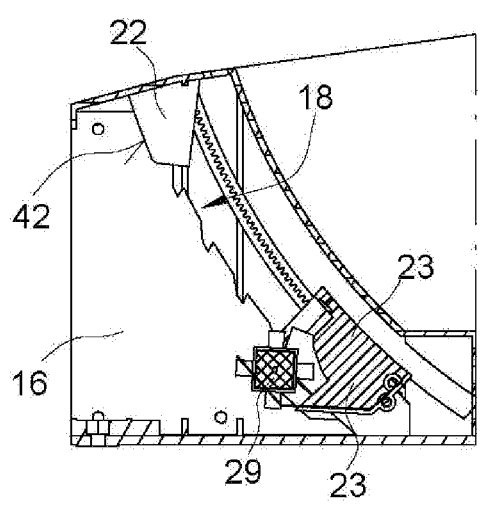
Figure 32:
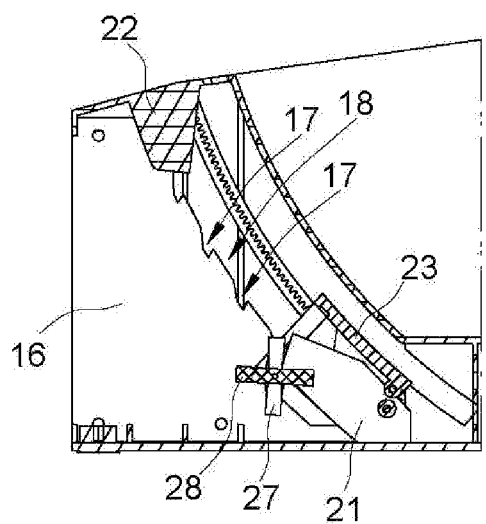
Figure 33:
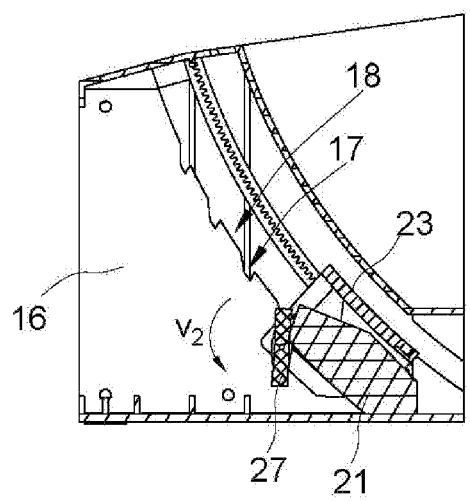
Figure 35:
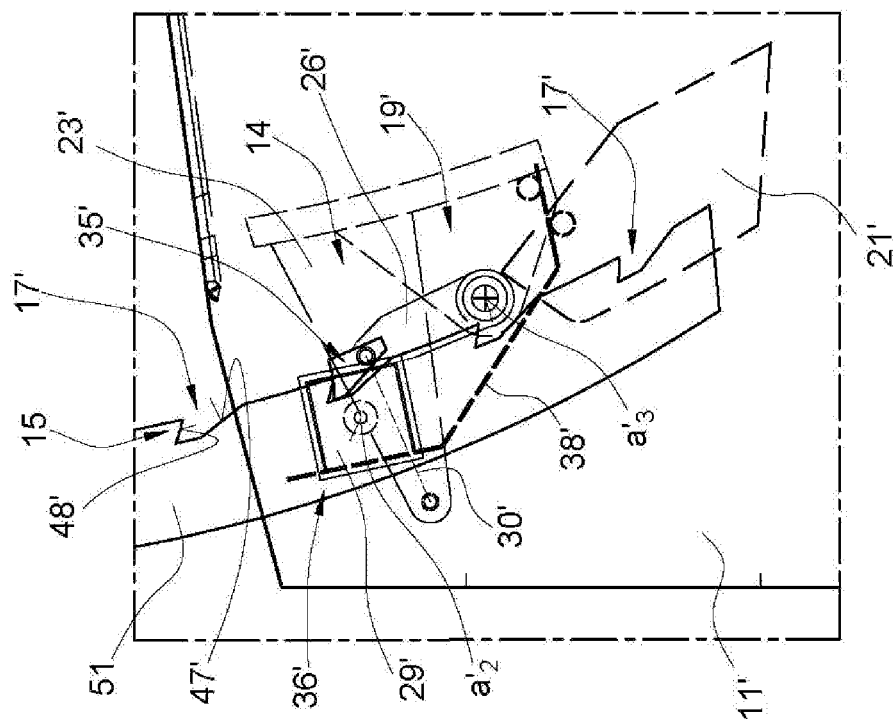
Figure 34:
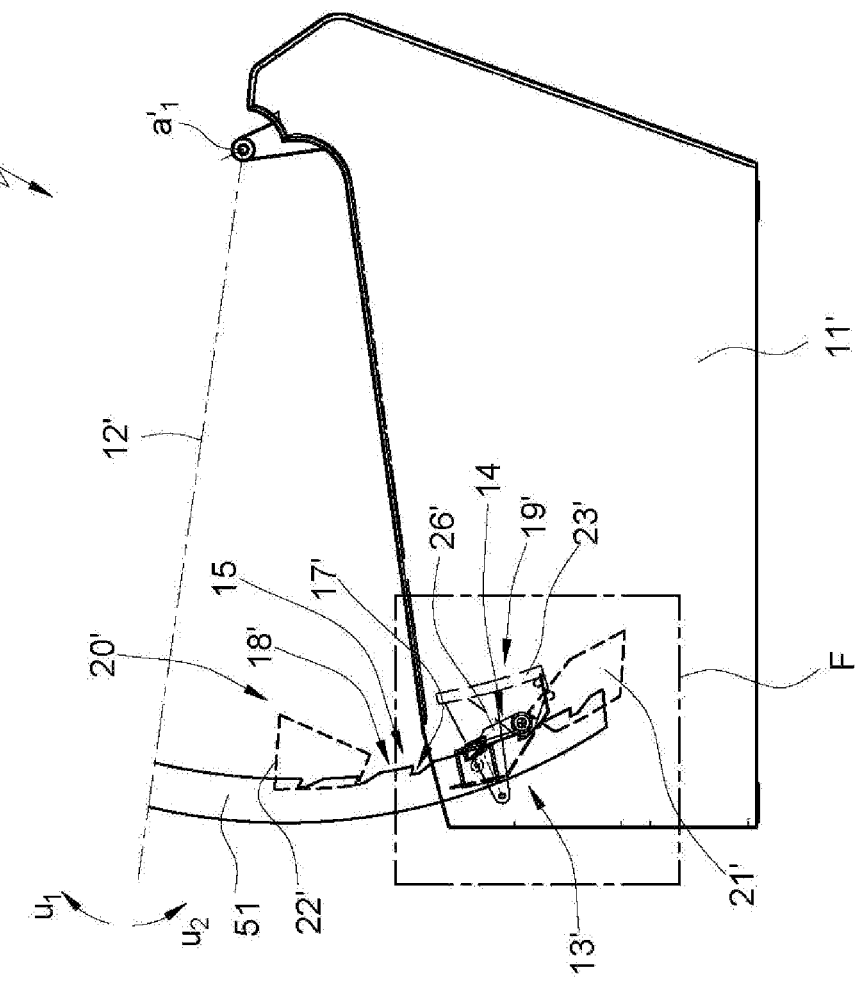

FIG. 1a is a perspective view of a center console as an accessory in the context of the invention obliquely from the front, FIG. 1b is a perspective view of the center console of FIG. 1a, with an arm support of the center console in FIG. 1 being indicated merely in the form of a broken line and with a front wall of the base not being mounted for clarity, FIG. 2a is a side view of the center console of FIG. 1, with the center console being represented as if transparent, so that parts of a locking device located in the interior of the outer walls can be recognized, FIG. 2b is a detail view of detail A in FIG. 2a, FIG. 3 is a perspective view of parts of the locking device from the front obliquely to the right, in a first end position of the adjustment part, FIG. 4 is a perspective view of parts of the locking device from the front obliquely to the left, in a first end position of the adjustment part, FIG. 5 is a top view of parts of the locking device, in a first end position of the adjustment part, in the present case a lower end position of the arm support, FIG. 6 is a perspective view of a setting device of the locking device, FIG. 7 is a sectional view along section line D-D in FIG. 5, FIG. 8 is a sectional view along section line E-E in FIG. 5, FIG. 9 is a sectional view along section line A-A in FIG. 5, FIG. 10 is a sectional view along section line B-B in FIG. 5, FIG. 11 is a sectional view along section line C-C in FIG. 5, FIG. 12, following FIG. 8, shows the locking device, with the adjustment part being moved further in the direction of the second end position, FIG. 13, following FIG. 8, shows the locking device, with the adjustment part being locked in a middle position between the first end position and the second end position, FIG. 14, following FIG. 8, shows the locking device, with the adjustment part being arranged shortly before reaching an upper end position, FIG. 15 is a sectional view of the locking device, following FIG. 7, with the adjustment part being in the position of FIG. 14, FIG. 16 is a sectional view of the locking device, following FIG. 9, with the adjustment part being in the position of FIG. 14, FIG. 17 is a sectional view of the locking device, following FIG. 10, with the adjustment part being in the position of FIG. 14, FIG. 18 is a sectional view of the locking device, following FIG. 11, with the adjustment part being in the position of FIG. 14, FIG. 19 is a sectional view of the locking device, following FIG. 7, with the adjustment part being in an upper end position, FIG. 20 is a sectional view of the locking device, following FIG. 8, with the adjustment part being in an upper end position, FIG. 21 is a sectional view of the locking device, following FIG. 9, with the adjustment part being in the upper end position, FIG. 22 is a sectional view of the locking device, following FIG. 11, with the adjustment part being in the upper end position, FIG. 23 is a sectional view of the locking device, following FIG. 8, with the adjustment part being in the upper end position, FIG. 24 is a sectional view of the locking device, following FIG. 7, with the adjustment part being in a middle position between the first end position and the second end position, FIG. 25 is a sectional view of the locking device, following FIG. 8, with the adjustment part being in a middle position between the first end position and the second end position, FIG. 26 is a sectional view of the locking device, following FIG. 9, with the adjustment part being in a middle position between the first end position and the second end position, FIG. 27 is a sectional view of the locking device, following FIG. 10, with the adjustment part being in a middle position between the first end position and the second end position, FIG. 28 is a sectional view of the locking device, following FIG. 11, with the adjustment part being in a middle position between the first end position and the second end position, FIG. 29 is a sectional view of the locking device, following FIG. 7, with the adjustment part being shortly before reaching the lower end position, FIG. 30 is a sectional view of the locking device, following FIG. 8, with the adjustment part being shortly before reaching the lower end position, FIG. 31 is a sectional view of the locking device, following FIG. 9, with the adjustment part being shortly before reaching the lower end position, FIG. 32 is a sectional view of the locking device, following FIG. 10, with the adjustment part being shortly before reaching the lower end position, FIG. 33 is a sectional view of the locking device, following FIG. 11, with the adjustment part being shortly before reaching the lower end position, FIG. 34, following FIG. 2a, shows a side view as if transparent of a second example of embodiment of an accessory part according to the invention in the form of a center console, FIG. 35 shows a detail view according to detail line F in FIG. 34.

The accessory overall is designated in the figures by the reference numeral 10.

The accessory 10 in FIGS. 1a and 1b comprises a base 11, and an adjustment part 12, which in the present example of embodiment is formed by an arm support of a center console that is pivotable about a pivot axis $a_1$. The adjustment part 12 is indicated in FIG. 1b for clarity merely by of a broken line. The base 11 here is formed by the carcass of the center console, which is fastened body-mounted to a vehicle.

The adjustment part 12 can be pivoted about the pivot axis $a_1$ in the directions $u_1$ and $u_2$ and can be releasably locked in different positions of use by a locking device 13 in such a way that—in a catch position of the locking device 13—pivoting is possible in the direction $u_1$, but is prevented in the direction $u_2$. In the release position of the locking device 13, movement in the directions $u_1$ and $u_2$ is possible.

In the side view of the accessory 10 of FIG. 2a, the base 11 is illustrated as if transparent, so that parts of the locking device 13 can be recognized. The locking device 13 comprises a first locking formations 15 associated with the adjustment part 12 and a second locking formations 14 associated with the base 11. The second locking formations 14 here comprise a wall 16 with locking structures, in the present case in the form of an arrangement 18 that comprises a plurality of cutouts 17 and a face 49 between the cutouts 17. The wall 16 is held immovably fixedly on the base 11.

The second locking formations 14 cooperate with the first locking formations 15, which in the present case comprise a catch that is pivotable about a pivot axis $a_3$ and can be brought releasably into engagement with each of the cutouts 17. The catch 26 in the present example of embodiment is part of an assembly 19 that is fastened to the adjustment part 12. Alternatively, it would likewise be possible to arrange the assembly 19 fixedly on the base 11 and to connect the arrangement 18 to the adjustment part 12 such that it is movable with the adjustment part 12, that is illustrated in a second example of embodiment in FIGS. 34 and 35.

The cooperating locking structures in the present example of embodiment are formed by form-fitting means. It should however be expressly pointed out here that alternatively structures that have a force-fitting action can be used instead of the form-fitting means.

The locking device 13 is movable between the catch position, in which the catch 26 is engaged with the arrangement 18, and a release position, in which the catch 26 is disengaged from the arrangement 18. The catch 26 that is held on the adjustment part 12 can be recognized e.g. in FIG. 2b. The assembly 19 also comprises a restoring device 30 that loads the catch 26 in engagement with the arrangement 18.

Further, the assembly 19 comprises a setting device 37 of a control system 20 (see e.g. FIG. 3), which is provided for actuating the catch 26 depending on the position of the adjustment part 12. The control system 20 engages the catch 26 with or disengages it from the arrangement 18 and holds the catch 26 in the set position.

In FIGS. 3 and 4, the locking device 13 is illustrated without the base 11 and the adjustment part 12. As can be recognized in FIGS. 3 and 4, the control system 20 comprises a first switching element 21 with a control face 40 on a first end region of the path of movement of the assembly 19, and a second switching element 22 with a control face 42 on a second end region of the path of movement of the assembly 19. The switching elements 21 and 22 are part of the control system 20 and are connected fixedly to the base 11 and provided for switching the locking device 13 over between the catch position and the release position.

In FIG. 3, further a holding element 23 of the assembly 19 can be recognized. The holding element 23 is fastened to a wall 50 of the adjustment part 12 and together with the adjustment part 12 pivots about the axis of rotation $a_1$. On the holding element 23 there is rotatably mounted a spindle 24 with the geometric axis of rotation $a_2$ of the setting device 37. Connected in a co-rotational manner to the spindle 24 is a setting structure 25, here in the form of a cam, which cooperates with the catch 26 that can be recognized in FIG. 4. The setting structure 25 moves the catch 26 between the catch position and the release position. The catch 26 is mounted on the holding element 23 pivotably about the pivot axis $a_3$.

There are furthermore connected in a co-rotational manner to the spindle 24 a first switching structure 27, a second switching structure 28 of the control system 20 and a latching element 29 of a positioning device 36 of the setting device 37. The first switching structure 25 cooperates with the control face 40 of the first switching element 21, and the second switching structure 28 cooperates with the control face 42 of the second switching element 22. The first switching structure 27 and the second switching structure 28 here are each in the form of an arm, wherein the longitudinal axis $m_1$ of the switching structure 27 and the longitudinal axis $m_2$ of the switching structure 28 are at an angle of approximately 90° to each other. The angle that the longitudinal axes of the switching structures 28 and 28 have relative to each other is however not essential to the invention. What matters is that the spindle 24 is movable in such a way that the setting device 37 is adjustable between the actuation position and the enabling position.

FIG. 5 is an illustration of the locking device 14 from below. The section lines A to E can be recognized in FIG. 5.

The setting device 37 with the spindle 24, the setting structure 25, the switching structure 27, the switching structure 28 and the latching element 29 of a positioning device 36 is illustrated in FIG. 6. As can be recognized in FIG. 6, the latching element 29 has two side walls 31a and 31b between which a quadrilateral is formed, the end faces 32 of which are formed set back with respect to the side walls 31a and 31b.

In FIG. 7, the assembly 19 is illustrated in a first end position, which in the case of the adjustment part 12 of the present example of embodiment is a lower end position. In FIG. 7, toothing 34 of a brake 43 can be recognized, which is merely of secondary importance for the invention. To the adjustment part 12 there is connected a toothed wheel 44 that is illustrated only schematically (merely illustrated in FIG. 2b—not all the teeth of the toothed wheel are shown). The toothed wheel 44 is engaged with the toothing 34. Movement of the toothed wheel, depending on the direction of rotation of the toothed wheel, is delayed e.g. by a low-viscosity medium, so that a movement of the adjustment part 12 in the direction of the first end position, here a downward movement of the arm support, is delayed. In the opposite direction of rotation, the toothed wheel can be turned unbraked, i.e. a movement in the direction of the second end position is not braked by the toothed wheel. In this way, the adjustment part 12 in the release position cannot suddenly move into the first end position.

In FIG. 6 it can be recognized that the setting structure 25 comprises actuating regions 45a and 45b in each case in the form of an arm, which are offset to each other by 180° angularly about the pivot axis $a_2$. The switching structures 27 and 28 each comprise actuating regions 46a and 46b, in each case in the form of an arm, that are offset by 180° to each other angularly about the pivot axis $a_2$. In this example of embodiment, merely the actuating regions 45a and 46a are used. The actuating regions 45b and 46b are merely used when the setting device unintentionally turns through 180°, i.e. are redundant. In other words, the setting structure 25 and also the switching structures 27 and 28 could also each have merely one actuating region.

In this example of embodiment, the spindle 24 is turned in each case through 90° in order to carry out a switching operation between the catch position and the release position. Depending on the configuration of the control system 20, the switching element 21 and the switching structure 27, and also the switching element 22 and the switching structure 28, may also cooperate in such a way that the spindle 24 pivots through a different angle of rotation, in order to pivot the setting device 37 between the actuation position and the enabling position.

The catch 26 comprises a contact region 33 and a catch region 35. In FIG. 7, the setting device 37 is in an enabling position in which the setting structure 25 does not actuate the contact region 33 of the catch 26. The catch 26 is therefore held in the catch position in engagement with the arrangement 18 by the restoring device 30. In FIG. 8, the catch 26 is engaged with the lowermost cutout 17 of the arrangement 18. In the actuation position of the setting device 37, the setting structure 25 actuates the contact region 33 of the catch 26 in such a way that the catch 26 is held disengaged from the arrangement 18, i.e. disengaged from the cutouts 17, counter to the force of the restoring device 30.

The catch 26 remains stably in the respective position because of the positioning device 36 (see FIG. 9), which can hold the setting device 37 in the present example of embodiment in four different positions. The setting device 37 is held stably in the catch position in which the actuating region 45a is engaged with the contact region 33 of the catch 26, in the catch position in which the actuating region 45b is engaged with the contact region 33, and in the two positions in which the setting structure 25 is not engaged with the contact region 33. As already mentioned above, merely two positions of the positioning device 36 are used, namely an actuation position and an enabling position, and the other actuation position and also the other enabling position are redundant.

The positioning device 36 comprises a latching spring 38, which cooperates with the four end faces 32 of the latching element 29 in order to hold the setting device 37 in the set position. The end faces 32 are set back with respect to the side walls 31a and 31b. The side walls 31a and 31b thus represent a guide for the latching spring 38 with respect to the directions parallel to the axis of rotation $a_2$.

In FIG. 5 and also in FIGS. 10 and 11 it can be recognized that the switching element 21 and the switching structure 27, and also the switching element 22 and the switching structure 28, in each case are in different planes. It can be seen in FIG. 10 that the switching structure 28 can therefore move past the switching element 21, while the switching structure 27 has been adjusted by the switching element 21 into a position in which it sets the setting device 37 into the enabling position. In this case, an outer face 39 of the switching structure 27 and a control face 40 of the switching element 21 cooperate.

The cutouts 17 are shaped in such a way that they are limited in the direction of movement $u_1$ by of an inclined face 47 and in the direction of movement $u_2$ by of a steep face 48. The catch region 35 is provided with a complementary shape, so that the catch 26 in the catch position of the locking device 14 can move in the direction $u_1$ over the arrangement, i.e. the catch 26 can be released from engagement with a cutout 17 with a slight actuating force on the adjustment part 12 in the direction $u_1$. If the catch 26 is located in a cutout 17, on the other hand a movement in the direction $u_2$ is prevented. That is to say, the adjustment part 12 in the catch position cannot be moved in the direction $u_2$ if the catch 26 is engaged with a cutout 17.

In FIGS. 12 to 14, the adjustment part 12 is moved in the direction $u_1$, with the catch 26 moving over the arrangement 18. In FIG. 13, the catch 26 is illustrated engaged with a cutout 17 in a middle position of the adjustment part 12. If the adjustment part 12 is moved so far in the direction $u_1$ that an outer face 41 of the switching structure 28 comes into contact with a control face 42 of the switching element 22 (see FIGS. 14 to 18), a moment about the axis of rotation $a_2$ is produced in the assembly 37 in the direction of rotation $v_1$ (see FIG. 17) that turns the spindle 24 in the direction $v_1$ counter to the force of the spring 38 of the positioning device 36.

Upon further movement of the adjustment part 12 in the direction $u_1$, the latching spring 38 latches with the latching element 29 in a position turned through 90° with respect to FIG. 7 (see FIGS. 19 to 23), in which the setting device 37 is in an actuation position in which the setting structure 25 moves the catch 26 of FIG. 19 out of engagement with the arrangement 18. In this release position of the locking device 13, the adjustment part 12 can be moved in the direction $u_1$ and $u_2$, since the catch 26 is disengaged from the arrangement 18.

In FIGS. 24 to 28, the adjustment part 12 has been moved in the direction $u_2$ and is in an intermediate position between the second end position and the first end position.

If the adjustment part 12 has been moved so far in the direction $u_2$ that the outer face 39 of the switching structure 27 comes into contact with the control face 40 of the switching element 21 (see FIGS. 29 to 33), a moment in the direction $v_2$ about the pivot axis $a_2$ is produced that pivots the spindle 24 through 90° in the direction $v_2$ into an unactuated position, with the setting structure 25 no longer holding the catch 26 disengaged from the arrangement 18 counter to the force of the restoring device 30. The positioning device 36 holds the setting device 37 in this position. The catch 26 is therefore loaded in engagement with the arrangement 18 by the restoring device 30 (see FIGS. 7 to 11). The locking device 13 is then in the catch position.

A second example of embodiment of an accessory 10' is illustrated in FIGS. 34 and 35. The second example of embodiment is a reversal of the association of the arrangement 18 and also of the adjustment elements 21 and 22 and of the assembly 19. The features known from the first example of embodiment have been provided with a prime. The functions of the device of the second example of embodiment are identical to the functions of the first example of embodiment.

In the second example of embodiment, the arrangement 18' with the cutouts 17' of the first locking formations 15 of the locking device 13' is formed on a wall 51 that is connected fixedly to the adjustment part 12', which is pivotable about the pivot axis $a_1$' in the directions $u_1$ and $u_2$, in this case a pivotable arm support. The adjustment part 12' is illustrated merely schematically in the form of a broken line. The switching elements 21' and 22' of the control system 20' are connected fixedly to the wall 51 as well.

The arrangement 18' differs from the first example of embodiment merely in the respect that the inclined face 47' and the steep face 48' are formed on reversed sides of the cutout 17'. The assembly 19' of the second locking formations 14 is designed substantially as in the first example of embodiment, but the holding element 23' is fastened fixedly to the base 11', which in this case too is formed by the body of a center console. Furthermore, the catch region 35' of the catch 26' that is pivotable about the pivot axis $a_3$' is formed complementarily to the cutout 17', so that the adjustment part 12' in the catch position of the locking device 13' is movable in the direction $u_1$ but immovably locked in the direction $u_2$. The restoring device 30' is indicated in FIG. 35 merely by of a broken line. Further, in FIG. 35 the latching element 29' that is arranged pivotably about the pivot axis $a_3$' and also the spring 38' of the positioning device 36' can be recognized.

The invention claimed is:

1. An accessory of a vehicle, the accessory comprising:
   a base;
   an adjustment part movable in translation and/or in rotation relative to the base along a path between a first end position and a second end position and lockable in at least one of the positions by a locking device with a first locking formation associated with the adjustment part and a second locking formation associated with the base;
   a control system having a first controller associated with the adjustment part and a second controller associated with the base, the controllers shifting the locking device between a catch position and a release position depending on the position of the adjustment part. one of the first and second controllers having a first switching element at a first end region of the path and a second switching element at a second end region; and
   a movable setting device of the other of the first and second controller actuatable by each switching element in such a way that locking formations in an operative connection with the setting device are movable between a catch position and a release position.

2. The accessory according to claim 1, wherein the setting device is movable between an actuation position in which the locking formations are in the release position and an enabling position in which the locking formations are in the catch position.

3. The accessory according to claim 1, wherein the setting device comprises at least one setting structure that cooperates with the locking formations and at least one switching structure that cooperates with at least one switching element, the setting structure and the switching structure being coupled to one another.

4. The accessory according to claim 1, wherein a first switching structure cooperates with a first switching element, and a second switching structure cooperates with a second switching element of the setting device.

5. The accessory according to claim 1, wherein the setting device is rotatable.

6. The accessory according to claim 1, wherein the setting device comprises at least two setting structures and/or at least two switching structures that are offset to each other angularly about the axis of rotation.

7. The accessory according to claim 1, wherein the setting device comprises at least two setting structures and/or at least two switching structures that are offset to each other parallel to the axis of rotation.

8. The accessory according to claim 1, wherein the setting device comprises at least one part of a positioning device that holds the setting device in the respective set position.

9. The accessory according to claim 1, wherein the positioning device is formed by a latch that comprises a first latch formation in the form of a spring and a second latch formation in the form of a latching seat for the spring, the one of the latch formations being coupled to the setting device and the other of the latch formations being coupled to the adjustment part or to the base.

10. The accessory according to claim 1, wherein a brake is provided that brakes movement of the adjustment part in at least one direction.

11. The accessory according to claim 1, wherein the claims in the accessory is a vehicle armrest and the adjustment part is an arm support movable relative to a body-mounted base.

\* \* \* \* \*